United States Patent
Mishne et al.

(10) Patent No.: US 10,242,003 B2
(45) Date of Patent: *Mar. 26, 2019

(54) SEARCH RELEVANCE USING MESSAGES OF A MESSAGING PLATFORM

(71) Applicant: Twitter, Inc., San Francisco, CA (US)

(72) Inventors: Gilad Mishne, Albany, CA (US); Jimmy Lin, McLean, VA (US)

(73) Assignee: TWITTER, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/832,751

(22) Filed: Dec. 5, 2017

(65) Prior Publication Data

US 2018/0095957 A1 Apr. 5, 2018

Related U.S. Application Data

(63) Continuation of application No. 13/786,245, filed on Mar. 5, 2013, now Pat. No. 9,836,461.

(51) Int. Cl.
G06F 17/30 (2006.01)

(52) U.S. Cl.
CPC .. *G06F 17/30011* (2013.01); *G06F 17/30616* (2013.01)

(58) Field of Classification Search
CPC ............... G06F 17/30011; G06F 17/30616
USPC ........................................................ 707/728
See application file for complete search history.

(56) References Cited

U.S. PATENT DOCUMENTS

| | | | |
|---|---|---|---|
| 7,593,995 B1* | 9/2009 | He ................ | G06Q 10/107 707/999.003 |
| 2008/0082607 A1* | 4/2008 | Sastry .............. | G06F 17/30896 709/204 |
| 2010/0131523 A1* | 5/2010 | Yu ................. | G06Q 10/107 707/756 |
| 2011/0178995 A1* | 7/2011 | Suchter ............ | G06F 17/30864 707/692 |
| 2011/0246457 A1* | 10/2011 | Dong .............. | G06Q 10/06 707/725 |
| 2012/0005217 A1* | 1/2012 | Zendejas .......... | G06F 17/30867 707/749 |
| 2012/0066212 A1* | 3/2012 | Jennings .......... | G06F 17/30144 707/723 |
| 2013/0091021 A1* | 4/2013 | Maslov ............ | G06Q 30/0251 705/14.69 |
| 2014/0074954 A1* | 3/2014 | Jin ................. | G06F 17/3089 709/206 |

* cited by examiner

*Primary Examiner* — Mahesh H Dwivedi
(74) *Attorney, Agent, or Firm* — Steven M. Greenberg, Esq.; Shutts & Bowen LLP

(57) ABSTRACT

A method and system for searching documents. The method can include: identifying a first set of messages of a messaging platform referencing a document; identifying message text of the first set of messages; associating the message text with the document in a storage repository; receiving, by a computer processor, a search request including a search term provided by a client; calculating, by the computer processor, a relevance score for the document based at least on the search term and the message text; and providing, to the client and based on the relevance score, a reference to the document in response to the search request.

18 Claims, 7 Drawing Sheets

Message Data Table 470

| Message ID 472 | Author Account ID 474 | Message Text 476 | Relevant Participant(s) 478 | In Reply to 480 | Related URLs 482 |
|---|---|---|---|---|---|
| 400 | @adam | This is why I hate football | | | http://t.co/PMsa6znV |
| 402 | @arman | What about player safety? | @adam | 400 | |
| 404 | @chloe | One thing you forget is the cost... | @adam | 400 | |
| 406 | @reza | Heavily biased if you ask me... | @adam | 400 | http://t.co/YUsa343F |
| 408 | @carrie | Concussions and CTE are the... | @brian, @adam | 402 | |
| 410 | @brian | I counted at least 3 bad calls in ... | @adam, @chloe | 404 | |
| 412 | @augustine | Also Patriots vs Falcons | @adam, @chloe, @brian | 410 | |

Figure 4B

SEARCH RELEVANCE USING MESSAGES OF A MESSAGING PLATFORM

BACKGROUND

Traditional search techniques depend on a variety of signals to identify and rank search results. These signals can involve low latency query-dependent analysis as well as higher latency query-independent analysis. When dealing with a large corpus of documents, it is important to select signals that (1) can be efficiently analyzed and (2) have a high relevance correlation with the desired results. Thus, a fast and efficient signal is useless if it produces non-relevant results. Conversely, a high-relevance signal can be infeasible for low-latency applications.

One example of a common relevance signal used by modern search engines is hyperlink anchor text. Hyperlink anchor text is the visible and selectable text of a hyperlink, usually displayed on a referring web page. Generally, hyperlink anchor text includes concise, descriptive, and contextually relevant terms, which can be useful in relevance scoring, when available. Though undoubtedly useful in a variety of applications, hyperlink anchor text as a relevance signal has some notable shortcomings. Specifically, hyperlink anchor text can be relatively slow to acquire since new web pages require time to accumulate inbound links. This type of delay can seriously hamper a time-critical or real-time analysis. Furthermore, hyperlink anchor text tends to consist primarily of descriptive language (i.e., a title), and can be a poor indicator of sentiment.

Hyperlink anchor text is just one example of a common relevance signal, and is typically used for web search. Search engines use a variety of relevance signals, which are weighted differently according to the application-specific requirements involved. For example, a real-time search engine can have entirely different requirements from those of a traditional search engine and may put a greater emphasis on timeliness as a search criterion. Regardless of the specific application, the right relevance signals must be selected, and the right combination of those relevance signals must be applied to produce meaningful, relevant results.

SUMMARY

In general, in one aspect, the invention relates to a method for searching documents. The method includes: identifying a first set of messages of a messaging platform referencing a document; identifying message text of the first set of messages; associating the message text with the document in a storage repository; receiving, by a computer processor, a search request including a search term provided by a client; calculating, by the computer processor, a relevance score for the document based at least on the search term and the message text; and providing, to the client and based on the relevance score, a reference to the document in response to the search request.

In general, in one aspect, the invention relates to a system for searching documents. The system includes: a computer processor; an aggregation module executing on the computer processor and configured to identify a first set of messages of a messaging platform referencing a document, identify message text of the first set of messages, and associate the message text with the document in a storage repository; and a search module configured to receive a search request including a search term provided by a client, calculate a relevance score for the document based at least on the search term and the message text, and provide, to the client and based on the relevance score, a reference to the document in response to the search request.

In general, in one aspect, the invention relates to a non-transitory computer-readable storage medium including instructions for searching documents. The instructions are configured to execute on at least one computer processor and include functionality to: identify a first set of messages of a messaging platform referencing a document; identify message text of the first set of messages; associate the message text with the document in a storage repository; receive a search request including a search term provided by a client; calculate a relevance score for the document based at least on the search term and the message text; and provide, to a client and based on the relevance score, a reference to the document in response to the search request.

Other aspects of the invention will be apparent from the following description and the appended claims.

BRIEF DESCRIPTION OF THE DRAWINGS

Embodiments of the present invention are illustrated by way of example, and not by way of limitation, in the figures of the accompanying drawings and in which like reference numerals refer to similar elements.

FIG. 4B shows an example depiction of a message data table, in accordance with one or more embodiments of the invention.

DETAILED DESCRIPTION

Figure 1:
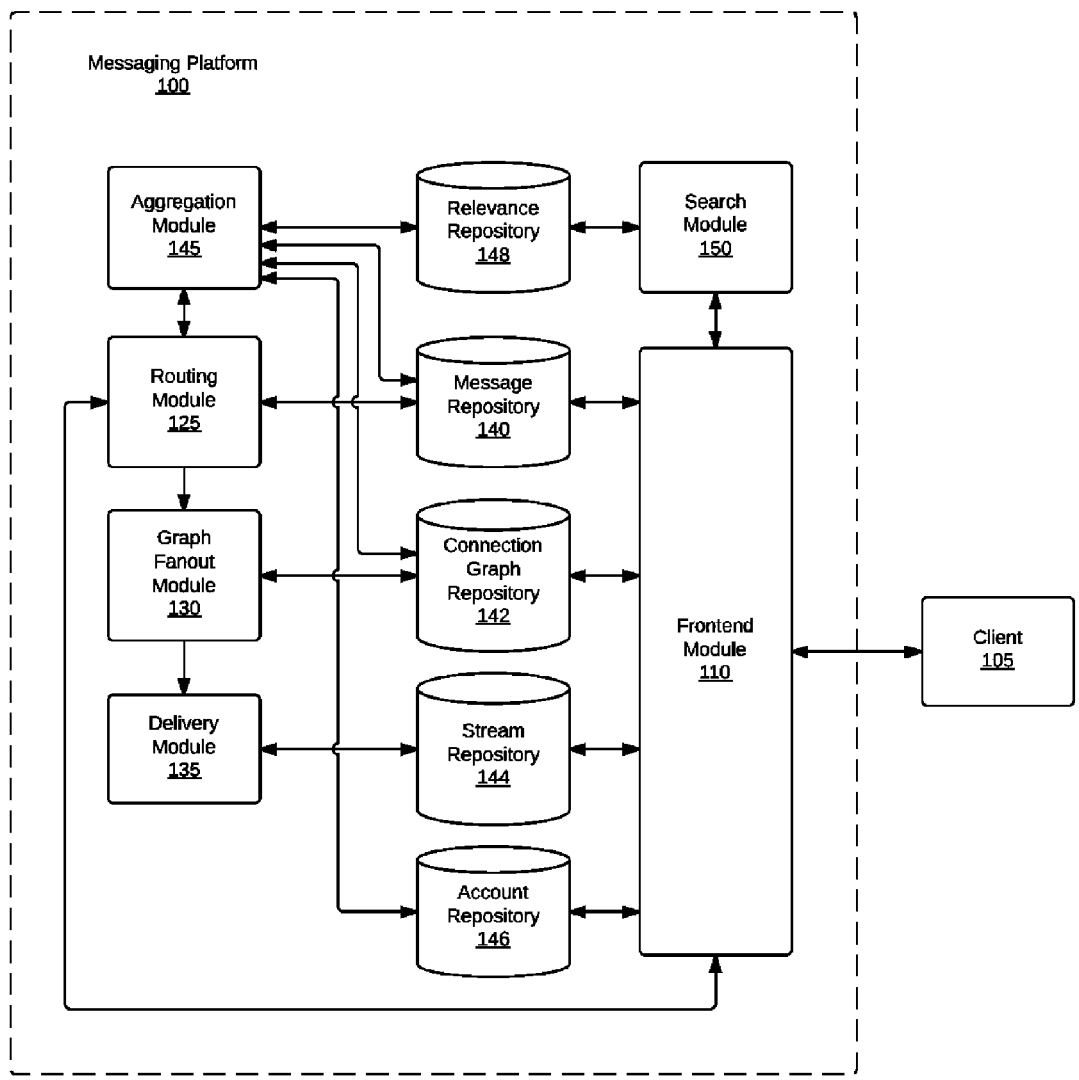
FIG. 1 shows a schematic diagram of a system, in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for searching documents. Messages including a reference to a document (e.g., a web page) are identified and message text is identified within the messages. The message text is then used as a relevance signal for purposes of identifying relevant documents in response to a search request.

FIG. 1 shows a messaging platform (100) and a client (105) in accordance with one or more embodiments of the invention. As shown in FIG. 1, the messaging platform (100) has multiple components including a search module (150), an aggregation module (145), a relevance repository (148), a frontend module (110), a search fanout module (115), a routing module (125), a graph fanout module (130), a delivery module (135), a message repository (140), a connection graph repository (142), a stream repository (144), and an account repository (146). Various components of the messaging platform (100) can be located on the same device (e.g., a server, mainframe, desktop Personal Computer (PC), laptop, Personal Digital Assistant (PDA), telephone, mobile phone, kiosk, cable box, and any other device) or can be located on separate devices connected by a network (e.g., a local area network (LAN), the Internet, etc.). Those skilled in the art will appreciate that there can be more than one of each separate component running on a device, as well as any combination of these components within a given embodiment of the invention.

In one or more embodiments of the invention, the messaging platform (100) is a platform for facilitating real-time communication between one or more entities. For example, the messaging platform (100) may store millions of accounts of individuals, businesses, and/or other entities (e.g., pseudonym accounts, novelty accounts, etc.). One or more users of each account may use the messaging platform (100) to send messages to other accounts inside and/or outside of the messaging platform (100). The messaging platform (100) may be configured to enable users to communicate in "real-time", i.e., to converse with other users with a minimal delay and to conduct a conversation with one or more other users during simultaneous sessions. In other words, the messaging platform (100) may allow a user to broadcast messages and may display the messages to one or more other users within a reasonable time frame so as to facilitate a live conversation between the users. Recipients of a message may have a predefined graph relationship with an account of the user broadcasting the message. In one or more embodiments of the invention, the user is not an account holder or is not logged in to an account of the messaging platform (100). In this case, the messaging platform (100) may be configured to allow the user to broadcast messages and/or to utilize other functionality of the messaging platform 100 by associating the user with a temporary account or identifier.

In one or more embodiments of the invention, the aggregation module (145) includes functionality to identify a set of messages posted to the messaging platform (100) that include a reference to a document. Examples of a document can include, but are not limited to, a web page, a file, an image, a map, and an electronic commerce listing. The reference can be any identifier (e.g., a uniform resource locator (URL), a uniform resource identifier (URI), a file path, etc.) of the document, in accordance with various embodiments. In one or more embodiments, the aggregation module (145) can be configured to identify the messages including the common reference in the message repository (140). Alternatively, in one or more embodiments, the aggregation module (145) can be configured to analyze messages for references as they are ingested by the routing module (125) and to annotate the messages with an identifier of the reference prior to the messages being stored in the message repository (140).

In one or more embodiments of the invention, the aggregation module (145) includes functionality to obtain message text extracted from the first set of messages. The aggregation module (145) can be configured to parse the text of each message and to ignore one or more predefined terms or text (e.g., prefixed usernames, single/double character terms, certain grammatical parts of speech, etc.). The remaining text can then be stored as message text. For example, the aggregation module (145) can be configured to select a sentence or other grammatical structure preceding the reference as message text. Alternatively, in one or more embodiments, the aggregation module (145) can be configured to select terms within a predefined number of characters of the reference as message text. Further semantic analysis and/or logic can be used to select message text from the message, in accordance with various embodiments of the invention.

In one or more embodiments of the invention, the aggregation module (145) includes functionality to analyze the message text of the messages to exclude non-relevant terms. The aggregation module (145) can perform a semantic analysis on the message text in order to identify relevant terms and/or to ignore non-relevant terms. The aggregation module (145) can be configured to save the full message text as relevant and/or to prune the message text in order to remove one or more predefined filter types and to designate the remaining terms as relevant. Examples of filter types can include, but are not limited to, references, personal information (e.g., names), usernames, auto-generated terms, and any other content that would be advantageous to remove from searchability. In one example, the aggregation module (145) can classify one or more of the terms as conveying positive, neutral, and/or negative sentiment. The sentiment value can then be associated with the corresponding message and/or terms in the relevance repository (148) and subsequently used as a search relevance signal.

In one or more embodiments of the invention, the aggregation module (145) includes functionality to expand, supplement, and/or replace one or more terms of the message text with descriptive text. For example, the aggregation module (145) may be configured to replace a username of an account with a display name of the account. In this example, the username "@Cardinals" is replaced with the text "St. Louis Cardinals". In another example, a stock ticker is supplemented with a company name. In this example, the ticker symbol "PANW" is modified to "PANW (Palo Alto Networks Inc.)" within the message text. The message text can further be modified to include display text, expand one or more identified acronyms, replace common mis-spellings and/or concatenations, or to otherwise improve the searchability of the message text, in accordance with various embodiments of the invention.

In one or more embodiments of the invention, the aggregation module (145) includes functionality to associate the message text with the document in the relevance repository (148). For example, terms of the message text can be stored in an inverted search index or similar set of data structures for use in responding to a search query.

In one or more embodiments of the invention, the aggregation module (145) includes functionality to identify one or more conversations involving messages that contain the reference. A conversation can include a root message and any number of messages directly or indirectly in reply to the root message. A conversation graph is a data structure that represents two or more messages in a conversation as nodes, with edges connecting the nodes based on a reply structure of the conversation. Users can view a conversation based on messages included in the conversation graph. Thus, for example, if a first user posts a first message including a URL, a second user may respond to the first message with a second message. In this example, the first message is a root message and the second message is a reply message. Other users can continue to reply to the messages with further reply messages, and so on. The aggregation module (145) can be configured to identify references within any type of message posted to the messaging platform. The aggregation module (145) may identify a root message or reply message containing the reference, to extract relevant terms from the message, and/or to associate the relevant terms with the message in the relevance repository (148). In one or more embodiments of the invention, as discussed below, the aggregation module (145) is configured to extract additional information (e.g., relevant terms) from other messages of the conversation containing the reference.

In one or more embodiments of the invention, the aggregation module (145) includes functionality to identify, within a conversation, one or more reply messages within a reply structure of the message containing the reference. The aggregation module (145) can be configured to identify messages in the conversation based on a degree of separation value (N) from the context message(s). The degree of separation value (N) is an integer representing a distance (number of edges) from the context message in the conversation graph. In this case, a context message is a message including the reference (e.g., a URL of a web page), and the identified messages are one or more reply messages.

Figure 2:
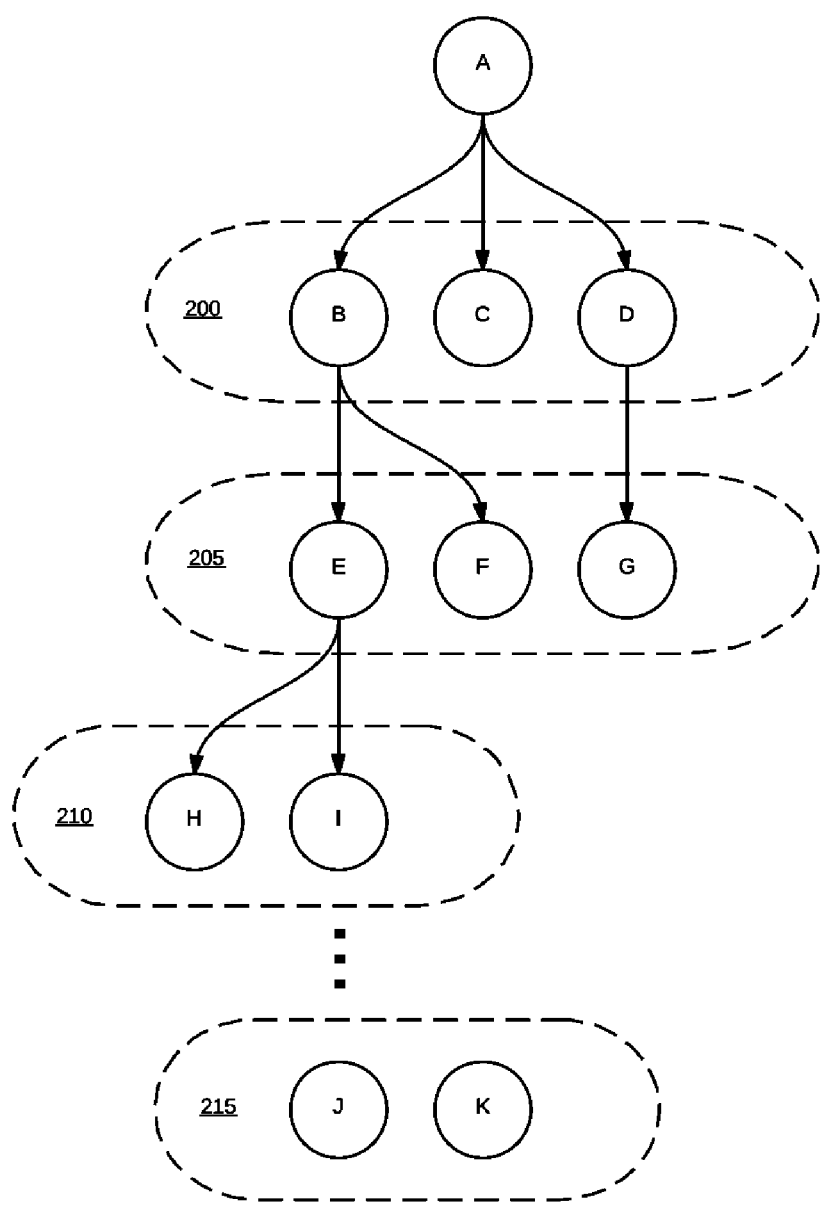
FIG. 2 shows an example depiction of a conversation graph, in accordance with one or more embodiments of the invention.

FIG. 2 shows an example depiction of a conversation graph (299) in accordance with one or more embodiments of the invention. As shown in FIG. 2, the conversation graph (299) has multiple components including a set of nodes (i.e., A, B, C, D, E, F, G, H, I, J, K) connected by a set of edges.

In the example of FIG. 2, node A is the root node and nodes 215 (J and K) are leaf nodes of the conversation graph (299). Nodes B, C, D, E, F, G, H, I, J, and K represent a reply structure of reply messages under the root node (A).

In one or more embodiments of the invention, the aggregation module (145) includes functionality to identify message text of the reply messages. As discussed above, the message text can include the entire text of a message or can be selected as a subset of the message relevant to the reference.

In one or more embodiments of the invention, the aggregation module (145) includes functionality to exclude non-relevant terms from the message text of the reply messages. As discussed above, the aggregation module (145) can be configured to save the full text of one or more reply messages as relevant and/or to prune the message text, in accordance with various embodiments.

In one or more embodiments of the invention, the aggregation module (145) includes functionality to identify a predefined threshold degree of separation value N, where N>=1. The predefined threshold degree of separation value N represents a distance from the context message in the conversation graph. For example, assuming that the root node (A) is selected as the context node, nodes 200 (B, C, and D) are 1 degree of separation from the context node, nodes 205 (E, F, and G) are 2 degrees of separation from the context node, and nodes 210 (H and I) are 3 degrees of separation from the context node.

In one or more embodiments of the invention, the aggregation module (145) includes functionality to identify a context message and a number of degrees of separation from the context message for one or more of the reply messages. The context message can be a message containing a reference, for example. The aggregation module (145) can be configured to identify only reply messages under the context message or to also identify one or more parent messages (i.e., messages in a direct or indirect ancestry of the context message in the conversation graph) of the context message, in accordance with various embodiments of the invention.

In one or more embodiments of the invention, the aggregation module (145) includes functionality to identify reply messages within the reply structure that have a degree of separation from the context message which is equal to the predefined threshold degree of separation value, for N>=1. Any number of threshold values can be used (e.g., N=1, N=2, etc.), such that the aggregation module (145) identifies reply messages having differing predefined degrees of separation from the context message. In one or more embodiments of the invention, the predefined threshold degree of separation value represents a maximum distance from the context message. Thus, the aggregation module (145) can be configured to identify reply messages within the reply structure that have a degree of separation from the context message which is less than or equal to a predefined value of N.

In one or more embodiments of the invention, the aggregation module (145) includes functionality to store the reply messages in a storage repository along with their corresponding degree of separation value. For example, the aggregation module (145) can be configured to associate the relevant terms with their degree of separation value in the relevance repository (148).

In one or more embodiments of the invention, the search module (150) includes functionality to receive, from a client, a search request including a search term. The search request can be received via frontend module (110) and/or any other intermediary modules/devices or can be created by frontend module (110) in response to a request from client (105), in accordance with various embodiments of the invention. The search terms can be part of a search string or other grouping of terms and can include one or more user entered search terms and/or one or more auto-generated terms (e.g., for filtering or otherwise restricting the requested search), in accordance with various embodiments of the invention.

Examples of a search term can include, but are not limited to, a general search term entered into a text box by a user of a client device (e.g., "Antarctica", "puppies", etc.), an attribute search term corresponding to searchable attribute of one or more documents, and/or any other term usable in identifying one or more documents. Search terms can be generated by a user or can be added to a search request based on a context of the search (e.g., image search, video search, news search, originating client platform, etc.). The client (105), frontend module (110), and/or search module (150) can be configured to add or modify a search term based on the context, in accordance with various embodiments.

In one or more embodiments of the invention, the search module (150) includes functionality to calculate a relevance score for each of a set of messages based on the one or more search terms and the relevant terms of the message. The search module (150) can be configured to calculate a relevance score for a predefined number of messages containing document references, or can calculate reference scores for a predefined time period before selecting a result set based on the calculated relevance scores. Each relevance score can represent a relevance of message text of the message to an associated document. For example, the search module (150) can be configured to retrieve the relevant terms from the relevance repository (148) in response to the search request. In this example, the search module (150) calculates a relevance score for a number of messages by analyzing the relevant terms to calculate a text match score indicating the relevance of the relevant terms to the document. An overall message relevance score is then calculated using the text match score and one or more other parameters. For example, the search module (150) can use the following scoring function, or a variant thereof, to calculate message relevance scores:
message_score=number_of_favorites*favorite_weight+number_of_expands*expand_weight+number_of_ rebroadcasts*rebroadcast_weight+ . . . +text_match_score* text_match_weight, where number_of_favorites is the number of accounts which have selected the message as a "favorite", where number_of_expands is the number of users who have expanded the message in order to view details of the message, where number_of_rebroadcasts is the number of time the message has been rebroadcasted by other users, where text_match_score is an information retrieval score used to determine similarity between message text of the message and an associated document (e.g., a document referenced by the message), and where favorite_weight, expand_weight, rebroadcast_weight, and text_match_weight are importance values (i.e., weights) which are designed to modify the relative importance of a parameter on the overall message relevance score (i.e., "message_score"). In one or more embodiments of the invention, with regard to the message relevance scoring function, the text_match_score parameter is calculated using a query-document ranking function such as Okapi BM25, machine-learned ranking (MLR), term frequency-inverse document frequency (tf-idf) and/or any other ranking function, in accordance with various embodiments of the invention. In this case, the "query" component of the query-document function is the message text and the "document" component is the document associated with the message (e.g., a document referenced by the message) and/or metadata associated with the document.

In one or more embodiments of the invention, the message relevance scores are query-independent (i.e., not dependent upon information provided in a particular search request), and can therefore be calculated by one or more background processes of the aggregation module (145) at any time prior to receiving a search request. Thus, the aggregation module (145) can be configured to calculate the message relevance score during or in conjunction with the process of ingesting the message. In one or more embodiments, individual message scores are calculated by the aggregation module (145) as they are received by the messaging platform and are processed asynchronously. Alternatively, one or more message scores can be queued and processed at one or more predefined time intervals or upon reaching a predefined number of queued messages. In one or more embodiments of the invention, the aggregation module (145) is configured to use a hybrid method, whereby messages which have already been ingested for posting to the messaging platform but have not been relevance scored are scored dynamically in response to receiving a search request. In this way, the aggregation module (145) can be configured to calculate message relevance scores using a combination of dynamic analysis (i.e., in response to a search request) and static analysis (i.e., prior to receiving a search request).

The message relevance score can be calculated based on any number of search relevance criteria. Examples of search relevance criteria can include, but are not limited to, timeliness of the message, frequency of a search term within the message, density of a search term within the message, credibility of an authoring account of the message, ranking of the message, grammatical quality of the message, an engagement value of the message, an association of the message with an originating account of the search request (e.g., a message/author attribute or category), and any other criteria that can be used to modify a relevance score of a message. In one or more embodiments of the invention, the search relevance criteria are inputs to the scoring function. Messages can be selected for inclusion in a result set based on the calculated relevance scores (e.g., by selecting a predefined number of messages with the highest relevance scores).

In one or more embodiments of the invention, the search module (150) includes functionality to modify or calculate the relevance score of a message based on the degree of separation value associated with one or more relevant terms. The search module (150) can be configured to assign a weight to each degree of separation value and to weight the relevant terms extracted from messages having that degree of separation accordingly. In this way, the search module (150) can be configured to decrease the relative impact of a low-weighted term on the relevance score of a reference and/or to increase the relative impact of a high-weighted term on the relevance score of a reference (e.g., by using the weight(s) as an input to the scoring function). For example, the text_match_score (discussed above) can be calculated using tf-idf, where the individual term scores are weighted according to the aforementioned degree of separation value. Thus, for example, the weight value assigned to each term can decrease the term score as a function of its distance from a context message. For example, the weight value $1/(X+1)$ can be used, where X is the degree of separation (for $X>=0$).

In one or more embodiments of the invention, the aggregation module (145) includes functionality to calculate and/or obtain an engagement value associated with one or more messages. An engagement value is any representation of user engagement with one or more messages posted to the messaging platform (100). Examples of an engagement value can include, but are not limited to, an average number of message rebroadcasts, an average number of favorites, an average number of likes, and an average number of replies, an average number of views, an average number of clicks, and any other measure of engagement with a message.

In one or more embodiments of the invention, the search module (150) includes functionality to modify or calculate the relevance score of a message based on the engagement value. The engagement score can first be compared with a threshold value (e.g., an expected value). Based on this comparison, the search module (150) can be configured to modify the relevance score of the message. For example, the engagement value can be included as an input to the scoring function for calculating a message relevance score (as shown above with regard to "number_of_favorites", "number_of_expands", and "number_of_rebroadcasts"). In one or more embodiments, the engagement value is only included as an input to the scoring function if the minimum/maximum threshold value is surpassed and/or a weight value is used as an input to the scoring function in place of the actual engagement value.

In one or more embodiments of the invention, the aggregation module (145) includes functionality to calculate one or more expected or threshold values based on message data. For example, the aggregation module (145) may take messages corresponding to one or more similar documents or older messages (beyond a specified date/time) referencing the exact document, and then calculate an average engagement amount for those documents. In another example, the aggregation module (145) can be configured to select the average amount as the threshold amount, for comparison to other engagement values (e.g., engagement amount of a related document).

In one or more embodiments of the invention, the search module (150) includes functionality to calculate a document relevance score based at least on one or more message relevance scores of messages associated with the document (e.g., messages including a reference to the document, messages in a conversation of a message referencing the document). The message relevance scores can be used to calculate an average, median, or other representative message relevance score for messages referencing or otherwise related to a particular document (e.g., messages containing a reference to the document or reply messages in a reply structure. The search module (150) can then use the representative message relevance score to calculate a document relevance score. For example, the search module (150) can calculate the document relevance score using the following scoring function, or a variant thereof: document_score=text_match_score*text_match_weight+ number_of_clicks*click_weight+ . . . + representative_message_score*message_score_weight, where the text_match_score is an information retrieval score used to determine similarity between the search term(s) and the document, where number_of_clicks is a number of clicks of a reference to the document (e.g., clicks of the reference among messages of the messaging platform (100) within a predefined time window), where representative_message_score is the representative message score (e.g., a summation of all message scores of messages containing a reference to the document), where text_match_weight, click_weight, and message_score_weight are importance values (i.e., weights) which are designed to modify the relative importance of a parameter on the overall document relevance score. In one or more embodiments of the invention, with regard to the document relevance scoring function, the text_match_score is calculated using a query-document ranking function such as Okapi BM25, machine-learned ranking (MLR), term frequency-inverse document frequency (tf-idf) and/or any other ranking function, in accordance with various embodiments of the invention. In this case, the "query" component of the query-document function are the terms of the search request and the "document" component is the document associated with the message (e.g., a document referenced by the message) and/or message data associated with the document (e.g., message text from messages having a message score exceeding a predefined threshold).

In one or more embodiments of the invention, the search module (150) includes functionality to provide, to the client (105) and based on one or more document relevance scores, a result set including references to one or more documents. The result set can be generated by identifying a predefined number of documents with the highest document relevance scores for inclusion in the result set. In one or more embodiments of the invention, the search module (150) includes functionality to return a second result set (e.g., in response to a flag or other request) to the client (105) in conjunction or associated with the result set of documents. The second result set can include identifiers of one or more messages having the highest message relevance scores. In one or more embodiments, the client (105) is configured to display at least a portion of the document result set and at least a portion of the second result set concurrently in an application window (e.g., in a web browser or native client application window) in response to a search request submitted by a user.

In one or more embodiments of the invention, the aggregation module (145) includes functionality to determine, based on a relevance signal, that two different documents, which are referenced by different sets of messages, are related. The aggregation module (145) can be configured to apply the relevance signal in order to modify or calculate a related relevance score representing the relevance of one document to at least one other document. If the related relevance score exceeds a predefined threshold, the aggregation module (145) can be configured to store the association between the two documents in the relevance repository (148). In one or more embodiments, the aggregation module (145) can be configured to associate messages and/or terms referencing similar documents and to use the associations (in conjunction with search module 150) to provide relevant search results.

In one or more embodiments of the invention, the predefined relevance signal is a common base uniform resource locator (URL) of the first web page and the second web page. Other examples of a relevance signal can include, but are not limited to, a minimum occurrence of common keywords (e.g., hashtags), a minimum percentage/amount of common authoring accounts, a predefined percentage/amount of shared conversations (i.e., messages within a common conversation), a predefined table of source associations (e.g., related base URLs), and/or any other criteria for associating two or more documents.

In one or more embodiments of the invention, given two related documents, the search module (150) includes functionality to modify the relevance score calculated for a first related document based on the relevance score of a second related document. For example, search module (150) can be configured to weight the first relevance score by a weighted amount of the second relevance score. For example, given a first relevance score of 100 for a first document, the search module (150) can identify 3 related documents which have an average calculated relevance score of 60. The search module (150) can then modify the first relevance score using the following scoring function, or a variant thereof: Snew=Sold+(X−Sold)*W, where Snew is the new resulting relevance score, where Sold is the first relevance score, where X is the average calculated relevance score of the related documents, where W is a weight value, and where 0<W<=1.

In one or more embodiments of the invention, the aggregation module (145) includes functionality to assign weights to one or more relevant terms and/or messages. The weighted relevant terms can be terms extracted from one or more messages including a reference to a document and/or one or more reply messages, in accordance with various embodiments. The aggregation module (145) may assign the weights in order to increase or decrease the relative impact of the term on the message relevance score. Thus, for example, the impact of a term that is assigned a weight of 0.5 may be less than the impact of a term that is assigned a weight of 1.5. Regardless of the scoring algorithm used, the weighted scoring of the relevant terms can be incorporated to increase or decrease their effect on the message relevance score. The aggregation module (145) may assign weights to the relevant terms based on data associated with the message(s) containing the terms and/or authoring accounts of the source message(s).

For example, the aggregation module (145) can be configured to increase or decrease the weight of relevant terms that are not found in the document itself. In this way, terms that are common among messages but are absent in the document itself can be emphasized to increase the importance of outside perspective or de-emphasized to decrease the importance of outside perspective when calculating message relevance scores. Similarly, in one or more embodiments, the aggregation module (145) is configured to increase or decrease the weight of messages containing relevant terms that are not found in the document itself (e.g., by weighting the message relevance score of the message).

In another example, the aggregation module (145) can be configured to assign the weight of a relevant term and/or message based on engagement data of the source message, credibility of an author of the source message, one or more topics (i.e., categories) determined to be relevant to the source message, a location associated with the source message (e.g., by matching global positioning system (GPS) coordinates tagged to the source message with a location associated with the document), and/or any other data obtained from the messaging platform (100) and relevant to an identified term.

In a first example, aggregation module (145) assigns increased weights to relevant terms identified in a popular source message. In this example, the popularity of the message is represented by a number of rebroadcasts of the source message. If the number of rebroadcasts exceeds a predefined threshold of 10, the aggregation module (145) assigns a weight of 2 to relevant terms identified in the message. The search module (150) then doubles the impact of those weighted terms (i.e., based on the weight of 2) in the message relevance scoring algorithm. In one or more embodiments of the invention, any other engagement value (e.g., shares, favorites, likes, and etc. of the source message) can be used to weight the relevant terms. Since multiple source messages can include the relevant term, a predefined number of high-engagement source messages may need to exist in order to increase the weight of the relevant terms. Similarly, in one or more embodiments, the aggregation module (145) is configured to increase or decrease the weight of the popular source messages containing the terms (e.g., by weighting the message relevance score of the message).

In another example, the aggregation module (145) assigns increased weights to relevant terms identified in source messages that are authored by credible authors. The aggregation module (145) can be configured to calculate a particular author's credibility score algorithmically based on the particular author's relationships and/or interaction with other users. For example, if a particular user is followed by multiple high profile or prolific accounts, the particular user will typically have a high credibility score. A credibility score can be based on a qualitative indicator (i.e., low, medium, high) or a quantitative indicator, such as a value from 1 to 10. In this example, if the credibility score of the authoring account of the source message exceeds a predefined threshold, the weight assigned to the relevant terms identified in that source message can be increased by a factor of X, for X>1. Similarly, in one or more embodiments, the aggregation module (145) is configured to increase or decrease the weight of the source messages authored by credible authors (e.g., by weighting the message relevance score of the message).

In one or more embodiments of the invention, the aggregation module (145) includes functionality to assign one or more topics to one or more messages of the messaging platform (100). Alternatively, the aggregation module (145) can be configured to receive the assigned topics from a different component of the messaging platform. Topics can be assigned to the messages based on textual matching (e.g., matching the topic to a term in the message), semantic analysis (e.g., matching the topic to a semantically equivalent term in the message), and/or any other method of assigning topics to messages.

In one example, the aggregation module (145) assigns increased weights to relevant terms identified in messages associated with a trending topic. In this example, the aggregation module (145) is configured to determine that messages related to a forming Atlantic hurricane named Bart have increased beyond a fixed or dynamically updated threshold. The aggregation module (145) makes this determination by assigning the topic "Bart" or "hurricane Bart" to multiple messages based on the content of the messages. In response to the determination, the aggregation module (145) increases the weights of one or more relevant terms extracted from the messages. The aggregation module (145) can be configured to periodically adjust the weights based on changes to the popularity of the topic among messages over time. For example, the text_match_score parameter of the example message relevance score function (discussed above) can be calculated using a tf-idf algorithm, where the individual term scores are weighted according to whether or not a topic of the source message is trending. Thus, for example, the weight value assigned to each term can increase the weight of term scores of trending terms. For example, a predefined weight of 2 would double the term score for a term associated with a trending topic. In one or more embodiments of the invention, the weighted term scores can be applied to any variation of relevance scoring function.

In another example, the aggregation module (145) assigns increased weights to messages associated with a trending topic. The message relevance scores can be increased by setting the weight value to a predefined percentage increase and/or an increase proportional to the strength of the trend (e.g., a percentage increase from an average or baseline calculation). The aggregation module (145) can be configured to periodically adjust the weights based on changes to the popularity of the topic among messages over time.

In one or more embodiments of the invention, the aggregation module (145) includes functionality to extract relevant terms from one or more other sources (i.e., other than messages of the messaging platform (100)). For example, the aggregation module can extract relevant terms from hyperlink anchor text in web pages referencing a document. The search module (150) can be configured to use message text, in conjunction with the relevant terms obtained from the other sources, to calculate one or more relevance scores in response to a search request. The weights and combination of the relevant terms in calculating relevance scores can vary in accordance with various embodiments of the invention. In one or more embodiments of the invention, traditional scoring and ranking of documents in a search can be combined with the usage of relevant terms obtained from messages to increase the relevance of results.

In one or more embodiments of the invention, the aggregation module (125) is configured to access a whitelist of references. The whitelist can include references that are per-approved by an administrator or other entity for using message data as a relevance signal. Thus, in one or more embodiments, the aggregation module (125) is configured to use message text, engagement data, and/or other message data in the ranking of document search results only for documents associated with an entry in the whitelist. For example, the whitelist can include a list of base URLs, and the aggregation module (125) can be configured to analyze URLs within messages to determine if the base of the analyzed URL matches an entry in the whitelist. If so, the search module (150) can be configured to use message data as a relevance signal when calculating a document relevance score of a web page referenced by the analyzed URL. If the base of the analyzed URL does not match an entry in the whitelist, the search module (150) can use other relevance signals (non-message data) calculate the document relevance score.

In one or more embodiments of the invention, the search module (150) includes functionality to obtain one or more sentiment values associated with a document from the relevance repository (148). The search module (150) can be configured to identify a sentiment value representing a sentiment of one or more search terms. The search module (150) can use the sentiment value of the search terms and the sentiment values associated with the document as inputs to the document scoring function. The document scoring function can then be configured to increase the document relevance score of a document having sentiment values which matched the sentiment value of the search terms and/or to decrease the document relevance score of a document having sentiment values which are opposite to the sentiment value of the search terms.

In one or more embodiments of the invention, the aggregation module (145) is a software application or a set of related software applications configured to execute on one or more hardware processors. The aggregation module (145) can include one or more reader threads configured to perform multiple concurrent searches/analysis of messages of the messaging platform (100). The aggregation module (145) can be a component of a service-oriented architecture (SOA) or any other software platform, either inside or outside of the messaging platform (100), in accordance with various embodiments. In one or more embodiments of the invention, one or more components of the aggregation module (145) reside in a cloud computing application in a network distributed system. In one or more embodiments of the invention, aggregation module (145) is integrated within or operatively connected to one or more other components of the messaging platform (100).

In one or more embodiments of the invention, the search module (150) includes functionality to search messages in reverse chronological order of their posting time to the messaging platform (100). In other words, the search module (150) begins searching the most recent messages first and searches older messages as it continues to search. In one example, the search module (150) discontinues the search once a message corresponding to a certain time threshold is reached (e.g., a message that is 7 days old). In another example, the search module (150) discontinues the search after identifying a certain number of matching messages. The search module (150) can be configured to search the messages using an inverted index storing the terms of each message.

In one or more embodiments of the invention, the query-dependent functionality (or any other subset of the functionality) of the search module (150) can be performed by a runtime component (e.g., a search engine external to the messaging platform (100)). Thus, the search module (150) can be configured to provide message data (e.g., message text, conversation data, engagement data, etc.), message relevance scores, representative message relevance scores, and/or other required data to the runtime component via frontend module (110).

In one or more embodiments of the invention, the routing module (125) includes functionality to receive one or more messages and to store the messages in the message repository (140). The routing module (125) can be configured to is assigned an identifier to the message and to notify the graph fanout module (130) of a sender of the message.

In one or more embodiments of the invention, the graph fanout module (130) includes functionality to retrieve graph data from the connection graph repository (142) and to use the graph data to determine which accounts in the messaging platform (100) should receive the message. The graph data, for example, can reflect which accounts in the messaging platform are "following" a particular account and are, therefore, subscribed to receive status messages from the particular account.

In one or more embodiments of the invention, the delivery module (135) includes functionality to receive a list of accounts from the graph fanout module (130) and the message identifier generated by the routing module (125) and to insert the message identifier into stream data associated with each identified account. The delivery module (135) can then store the message list in the stream repository (144). The stream data stored in the stream repository (144) can make up one or more streams associated with one or more accounts of the messaging platform (100). A stream may be a dynamic list of messages associated with one or more accounts or can reflect any arbitrary organization of messages that is advantageous for the user of an account.

In one or more embodiments of the invention, the frontend module (110) is a software application or a set of related software applications configured to communicate with external entities (e.g., client (105)). The frontend module (110) can include the application programming interface (API) and/or any number of other components used for communicating with entities outside of the messaging platform (100). The API can include any number of specifications for making requests from and/or providing data to the messaging platform (100). For example, a function provided by the API can provide suggested accounts to a requesting client (105).

In one or more embodiments of the invention, the frontend module (110) is configured to use one or more of the data repositories (message repository (140), connection graph repository (142), stream repository (144), account repository (145), and relevance repository (148)) to define streams for serving messages (i.e., stream data) to a user of the account on the messaging platform (100). A user can use any client (105) to receive the messages. For example, where the user uses a web-based client to access the messaging platform (100), an API of the frontend module (110) can be utilized to define one or more streams and/or to serve the stream data to the client for presentation to the user. Similarly, different forms of message delivery can be handled by different modules in the frontend module (110). In one or more embodiments of the invention, the user can specify particular receipt preferences which are implemented by the frontend module (110).

In one or more embodiments of the invention, the search module (150) is a software application or a set of related software applications configured to execute on one or more hardware processors. The search module (150) can include one or more reader threads configured to perform multiple concurrent searches of messages of the messaging platform (100) and/or documents indexed for search (e.g., in an inverted search index). The search module (150) can be a component of a service-oriented architecture (SOA) or any other software platform, either inside or outside of the messaging platform (100), in accordance with various embodiments. In one or more embodiments of the invention, one or more components of the search module (150) reside in a cloud computing application in a network distributed system. In one or more embodiments of the invention, the search module (150) is integrated within or operatively connected to one or more other components of the messaging platform (100).

In one or more embodiments of the invention, one or more of the data repositories (message repository (140), connection graph repository (142), stream repository (144), account repository (146), and relevance repository (148)) is a database and/or storage service residing on one or more servers. For example, one or more of the data repositories may be implemented as a storage service using service-oriented architecture (SOA) and configured to receive requests for data and to provide requested data to other components of the messaging platform (100). In another example, the message repository (140) can include one or more tables in a distributed database management system (DBMS), a clustered database, a standalone flat file, and/or any storage software residing on one or more physical storage devices. Examples of a storage device may include, but are not limited to, a hard disk drive, a solid state drive, and/or other memory device. Any type of database or storage application can be used, in accordance with various embodiments of the invention.

In one or more embodiments of the invention, one or more of the data repositories (message repository (140), connection graph repository (142), stream repository (144), account repository (146), and relevance repository (148)) is a separate application or set of applications residing on one or more servers external (and communicatively coupled) to the messaging platform (100). Alternatively, in one or more embodiments, one or more of the data repositories can be an integrated component of the messaging platform (100) and/or can reside, either partially or entirely, on one or more common hardware devices (e.g., a server).

Figure 3A:
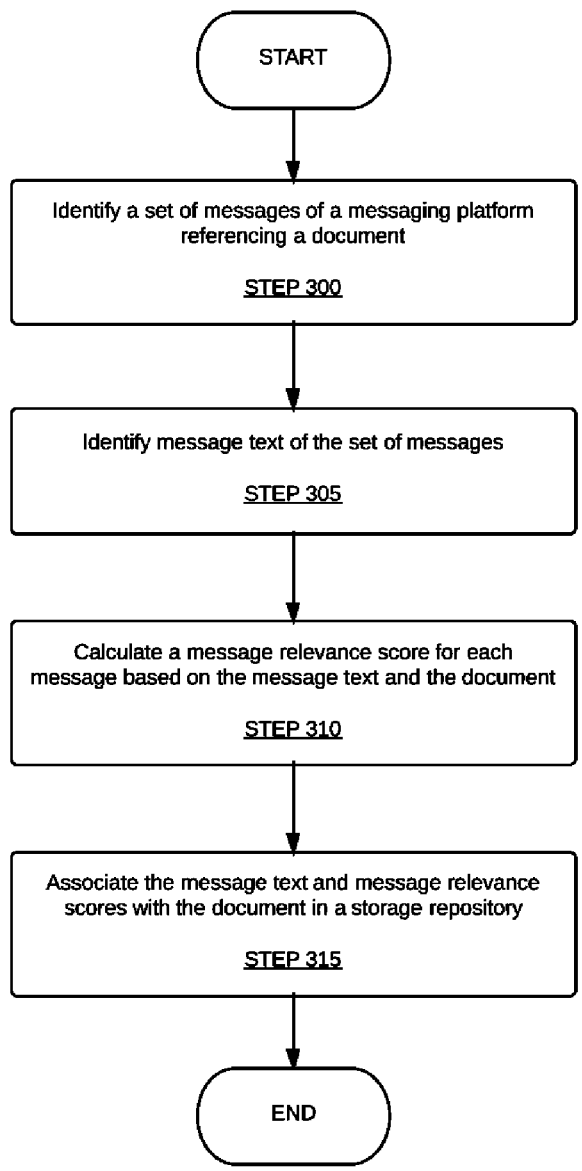
FIGS. 3A and 3B show flowcharts, in accordance with one or more embodiments of the invention.

FIG. 3A shows a flowchart of a method for searching documents. While the various steps in this flowchart are presented and described sequentially, one of ordinary skill will appreciate that some or all of the steps can be executed in different orders and some or all of the steps can be executed in parallel. Further, in one or more embodiments of the invention, one or more of the steps described below can be omitted, repeated, and/or performed in a different order. Accordingly, the specific arrangement of steps shown in FIG. 3A should not be construed as limiting the scope of the invention.

In STEP 300, a first set of messages of a messaging platform is identified. Messages containing references to documents can be identified as they are ingested by a messaging platform. In one or more embodiments of the invention, other messages can also be identified based on their relationship to one or more messages containing a reference (i.e., context messages). For example, reply messages below a context message can be identified within a conversation graph.

In STEP 305, message text of the first set of messages is identified. The message text can be the complete text of the identified messages, or can be pruned to remove one or more terms not desired for searchability.

In STEP 310, a message relevance score is calculated for each message. The message relevance score can represent relevance of the message to the referenced document and can be calculated based on the message text of the message using a scoring function with various inputs (e.g., as described above with regard to the aggregation module (145) of FIG. 1).

In STEP 315, the message text and/or the message relevance scores are associated with the document in a storage repository and are made available to a search component of the messaging platform (e.g., search module (150) of FIG. 1, discussed above) for query-dependent search. In one or more embodiments, STEP 310 is omitted and/or performed dynamically in response to a search request. If omitted, the message text of each message can be stored in the storage repository and used as an input to a query-dependent document relevance scoring function. Alternatively, in one or more embodiments, term relevance scores can be calculated for one or more terms within the message. The term relevance score can represent a relevance of the term to the referenced document, and can be calculated dynamically or calculated statically and associated with the document in the storage repository for use by the search component.

In one or more embodiments of the invention, STEPS 300-315 are performed periodically or on-demand by the messaging platform. Thus, the processing of FIG. 3A can be performed on each individual message as the message is ingested (i.e., received for posting) or can be performed at predefined intervals on batches of ingested messages. Furthermore, STEPS 300-315 can be performed concurrently by multiple background processes for multiple messages, in accordance with various embodiments of the invention.

Figure 3B:
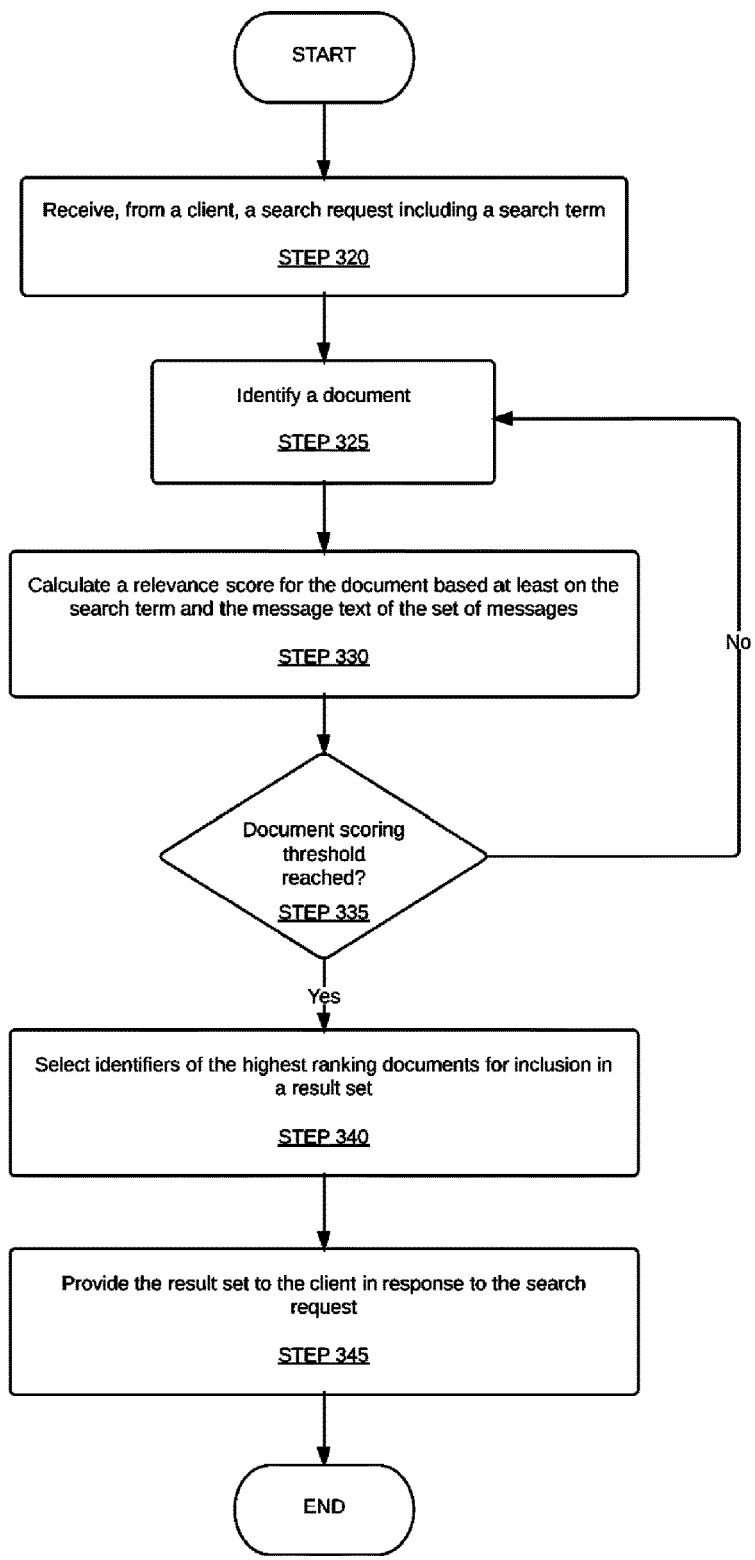

FIG. 3B shows a flowchart of a method for searching documents. While the various steps in this flowchart are presented and described sequentially, one of ordinary skill will appreciate that some or all of the steps can be executed in different orders and some or all of the steps can be executed in parallel. Further, in one or more embodiments of the invention, one or more of the steps described below can be omitted, repeated, and/or performed in a different order. Accordingly, the specific arrangement of steps shown in FIG. 3B should not be construed as limiting the scope of the invention.

In STEP 320, a search request including a search term is received from a client. The search request can be received from any client, including a server application of a web service, a client application executing on a client computing device (e.g., a smartphone), or any other software module executing on one or more hardware devices.

In STEP 325, a document is identified. In one or more embodiments of the invention, the document must either (1) contain at least one search term of the search request or (2) have associated message text containing at least one search term of the search request in order to be identified in STEP 325. The associated message text can be obtained from messages referencing the document and can be associated with an identifier of the document in a storage repository (e.g., in STEP 315 of FIG. 3A, discussed above). In one or more embodiments, if no documents are identified in STEP 325 for the current search request, an empty result set is returned to the client and the process ends. The document can be any searchable file, data structure, or collection of data containing searchable content (e.g., text). In STEP 330, a document relevance score is calculated for the document based at least on the search term and message text of messages associated with the document. The message text can be used directly in the calculation of the document relevance score or can be used to calculate a message relevance score which is then used as an input to the document relevance scoring function.

In STEP 335, it is determined whether a document scoring threshold is reached. If the document scoring threshold is reached, the process proceeds to STEP 340. If the document scoring threshold is not reached, the process proceeds to STEP 325. The document scoring threshold can be any threshold for determining that no further document scoring should take place. For example, the document scoring threshold can be a predefined number of document relevance scores, a predefined time period (e.g., a search latency), and/or any other threshold associated with the search.

In one or more embodiments of the invention, STEPS 325-335 are repeated concurrently by multiple threads of a search module (e.g., search module (150) of FIG. 1, discussed above). Thus, the calculation of document relevance scores can be performed serially, in parallel, and/or by a distributed system, in accordance with various embodiments of the invention.

The following section describes various examples of the invention. The examples are included to aid in the understanding of the invention but are not intended to limit the scope of the invention.

Figure 4A:
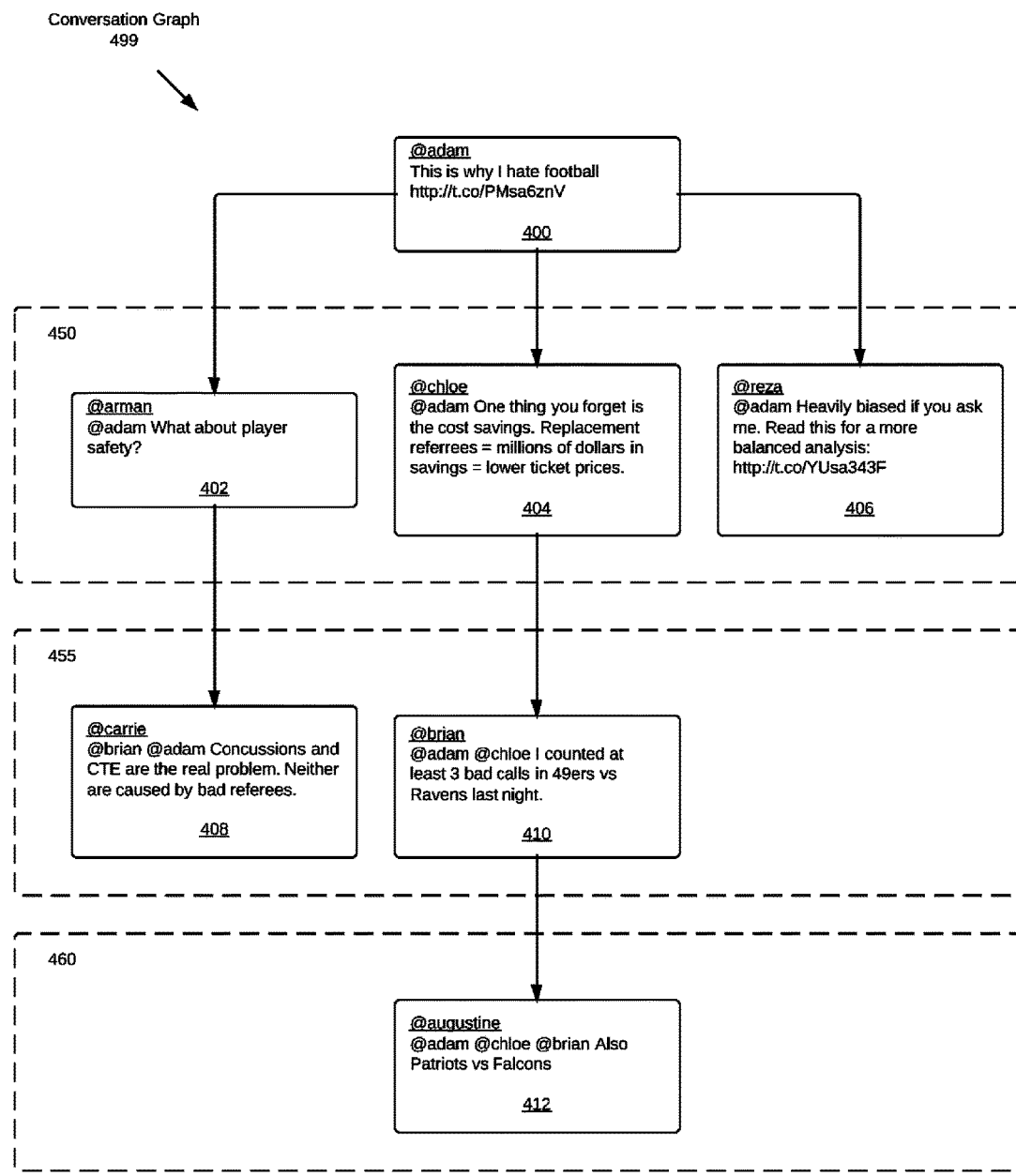
FIG. 4A shows an example depiction of a conversation graph, in accordance with one or more embodiments of the invention.

FIG. 4A depicts an example of a conversation graph (499). In this example, the conversation graph (499) includes a set of messages (400-412) posted to a messaging platform. Message 400 includes a URL to a sports article (http://t.co/PMsa6znV) and was posted by the account "@adam". Subsequent to message 400 being posted to a messaging platform, reply messages 402, 404, and 406 were posted to the messaging platform in reply to message 400. Reply messages 408, 410, and 412 were then posted in further reply to the posted messages. The edges of the conversation graph (499) represent the reply relationships between the messages of the conversation.

Continuing the example, an aggregation module of the messaging platform identifies the messages as they are ingested for posting by the messaging platform. Specifically the messages are posted to the messaging platform (i.e., made available to one or more accounts) and indexed for search in an inverted search index. The aggregation module identifies messages 400 and 406 as messages with URLs. The aggregation module then prunes message text of each of the messages by removing usernames and URLs from the message text. In this example, data from the messages is stored in message data table (470) of FIG. 4B, which includes a message ID field (472), an author account ID field (474), a message text field (476), a relevant participant(s) field (478), an in reply to field (480), and a related URLs field (482).

Continuing the example, the aggregation module calculates a message relevance score of for each message of the conversation graph (499) relative to the URL of message 400. Thus, each message relevance score depicts a relevance of the message to the web page referenced by the URL. The aggregation module also calculates relevance scores for any number of other messages associated with other URLs, including the URL of message 406, but for purposes of this example only the analysis of message 400 is emphasized. Each relevance score involves various different inputs, including a message text rank generated by a ranking function, which indicates the relevance of the message text to the web page. Other inputs to the message relevance scoring function include engagement values and a blacklist of spam accounts. Messages from blacklisted accounts incur a severe relevance penalty which effectively prevents them from impacting a search ranking of the web page. Among the messages of the conversation graph (499) no blacklisted accounts are identified.

Furthermore, the search module identifies reply messages that are associated with the URL. In this example, message 400 is the context message (i.e., the message including a reference to the web page) and messages 402-412 are the reply messages. The search algorithm identifies, for each reply message, a degree of separation from the context message, and weights the message relevance score of the reply message according to its corresponding degree of separation. Only reply messages within 2 degrees of separation of the context message are used as inputs to the document relevance scoring function. For example, in the conversation graph (499), the messages depicted by reference box 450 have a degree of separation value of one, the messages depicted by reference box 455 have a degree of separation value of two, and the messages depicted by reference box 460 have a degree of separation value of three. Thus, a message relevance score was never calculated for message 412 for the web page referenced by message 400. In this example, the weight value 1/(X+1) is used to reduce the message relevance scores of the reply messages, where X is the degree of separation. The message relevance scores are then aggregated to create a representative message relevance score associated with the document.

Continuing the example, the representative message relevance score is stored in a relevance repository along with the message data table (470). At this point in the example, the pre-processing portion of the analysis (which is performed by the aggregation module) is complete for the messages of the conversation graph (499).

Continuing the example, a search module of a web search engine receives a search request containing the search term "football". The search request is received from a mobile device of a user and passed on to a search module for processing. The search module begins calculating document relevance scores for a set of web pages. Some of the web pages which are referenced by the inverted search index are referenced by messages of the messaging platform (e.g., the web page referenced by message 400). For these messages, the search module identifies a representative message relevance score in the relevance repository and uses the representative message relevance score as an optional input to the document relevance scoring function.

Continuing the example, the document relevance scoring function calculates 1,500,000 document relevance scores before reaching a search latency of 100 milliseconds. Each document relevance score represents a relevance of a corresponding web page to the search term "football". Upon reaching 100 ms, the search module stops scoring documents and select the 20 highest ranked documents for inclusion in a result set. The result set, including identifiers of the 20 documents, is returned to the mobile device in response to the search request.

Figure 5:
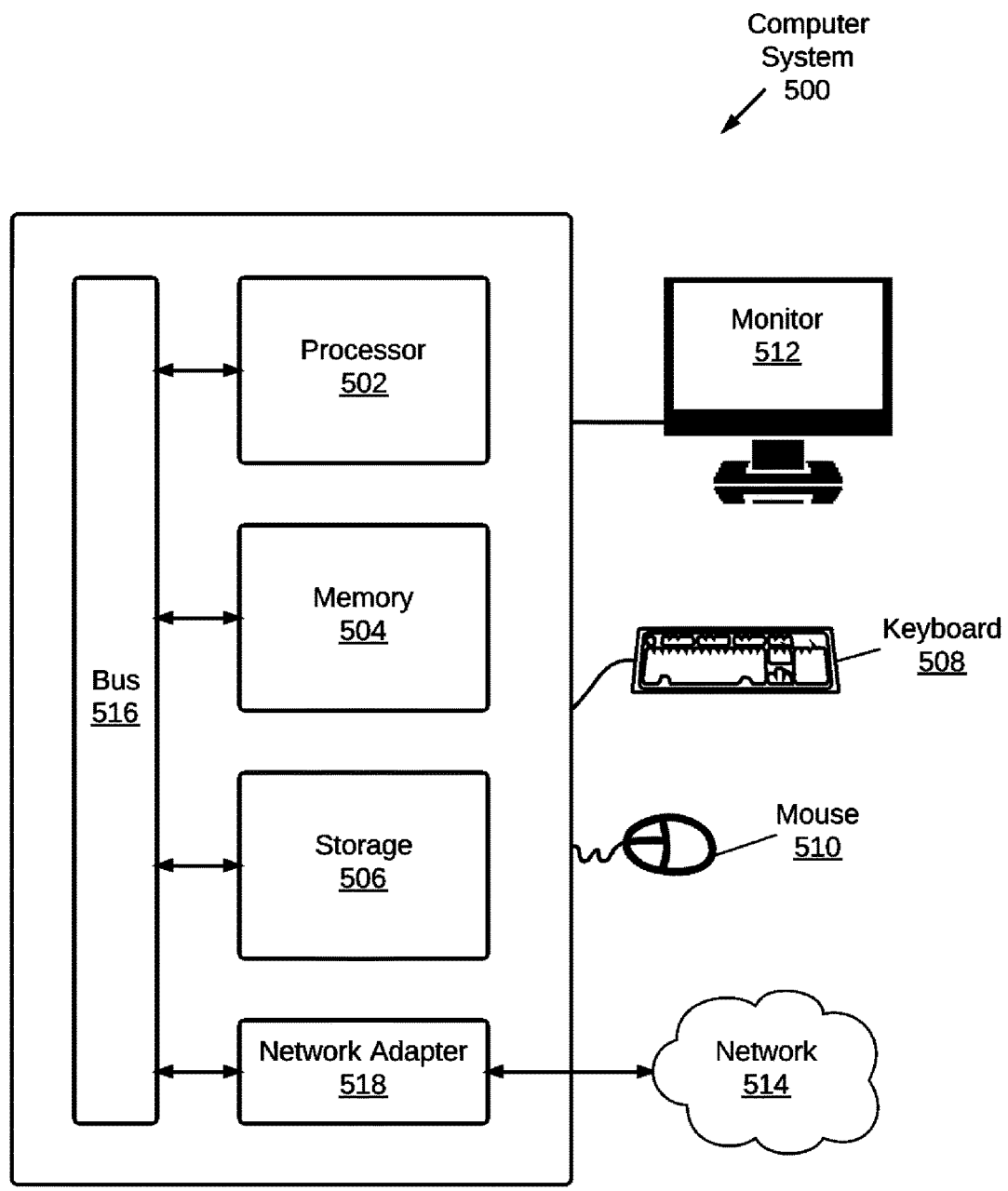
FIG. 5 shows a computer system, in accordance with one or more embodiments of the invention.

Embodiments of the invention may be implemented on virtually any type of computer regardless of the platform being used. For example, as shown in FIG. 5, a computer system (500) includes one or more processor(s) (502) (such as a central processing unit (CPU), integrated circuit, hardware processor, etc.), associated memory (504) (e.g., RAM, cache memory, flash memory, etc.), a storage device (506) (e.g., a hard disk, an optical drive such as a compact disk drive or digital video disk (DVD) drive, a flash memory stick, etc.), a network adapter (518), and numerous other elements and functionalities typical of today's computers (not shown). One or more components of the computer system (500) may be communicatively connected by a bus (516). The computer system (500) may also include input means, such as a keyboard (508), a mouse (510), or a microphone (not shown). Further, the computer system (500) may include output means, such as a monitor (512) (e.g., a liquid crystal display (LCD), a plasma display, or cathode ray tube (CRT) monitor). The computer system (500) may be connected to a network (514) (e.g., a local area network (LAN), a wide area network (WAN) such as the Internet, or any other type of network) via the network adapter (518). Those skilled in the art will appreciate that many different types of computer systems exist, and the aforementioned input and output means may take other forms. Generally speaking, the computer system (500)

includes at least the minimal processing, input, and/or output means necessary to practice embodiments of the invention.

Further, in one or more embodiments of the invention, one or more elements of the aforementioned computer system (500) may be located at a remote location and connected to the other elements over a network. Further, embodiments of the invention may be implemented on a distributed system having a plurality of nodes, where each portion of the invention (e.g., search module (150), aggregation module (145), relevance repository (148), etc. of FIG. 1, discussed above) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources.

Further, one or more elements of the above described systems (e.g., aggregation module (145), search module (150), relevance repository (148), etc. of FIG. 1, discussed above) can be implemented as software instructions in the form of computer readable program code stored, temporarily or permanently, on one or more non-transitory computer readable storage media. The non-transitory computer readable storage media are executable by one or more computer processors to perform the functionality of one or more components of the above-described systems (e.g., FIGS. 1A and 1B) and/or flowcharts (e.g., FIGS. 2A and 2B), in accordance with various embodiments of the invention. Examples of non-transitory computer-readable media can include, but are not limited to, compact discs (CDs), flash memory, solid state drives, random access memory (RAM), read only memory (ROM), electrically erasable programmable ROM (EEPROM), digital versatile disks (DVDs) or other optical storage, and any other computer-readable media excluding transitory, propagating signals.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

One or more embodiments of the invention have one or more of the following advantages. By using message text from messages of a messaging platform as a relevance signal for associated documents, it may be possible to improve the relevance of document search results. Specifically, in one or more embodiments, message text not included in the document which is found in messages of the messaging platform can be an important relevance signal. In one or more embodiments, engagement data corresponding to the messages and/or other relevant data from the messaging platform can be used to further improve the relevancy of the search results.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for searching documents, comprising:
identifying a first set of messages of a messaging platform referencing a document comprising a Web page;
identifying message text of the first set of messages;
associating the message text with the document in a storage repository;
receiving, by a computer processor, a search request comprising a search term provided by a client;
calculating, by the computer processor, a relevance score for the document based at least on the search term and the message text;
providing, to the client and based on the relevance score, a reference to the document in response to the search request;
identifying a second set of messages posted to the messaging platform and referencing another document comprising a second web page;
analyzing message text of the second set of messages;
determining, based on a predefined relevance signal, that the first web page is relevant to the second web page; and
calculating a second relevance score for the second web page based at least on the search term and the message text of the second set of messages, wherein calculating the relevance score is further based on the second relevance score.

2. The method of claim 1, further comprising calculating, based on the message text and the search term, a message relevance score for each message of the first set of messages; and calculating a representative message relevance score based on the message relevance scores, wherein calculating the relevance score for the document is further based on the representative message relevance score.

3. The method of claim 2, further comprising: identifying, for each message of the first set of messages, an engagement value representing user engagement with the message, wherein the message relevance score of the message is further based on the engagement value.

4. The method of claim 1, further comprising: identifying a set of conversations associated with the first set of messages; identifying a set of reply messages in the set of conversations; and analyzing message text of the set of reply messages, wherein calculating the relevance score is further based on the message text of the set of reply messages.

5. The method of claim 4, further comprising: identifying a maximum threshold degree of separation value (N); and determining that each of the set of reply messages is within N degrees of separation of at least one message of the first set of messages.

6. The method of claim 4, further comprising: determining that a first subset of the set of reply messages are each within one degree of separation of at least one message of the first set of messages; and determining that a second subset of the set of reply messages are each within two degrees of separation of at least one message of the first set of messages, wherein message text of the first subset is weighted more heavily than message text of the second subset when calculating the relevance score.

7. The method of claim 1, wherein the predefined relevance signal is a common base uniform resource locator (URL) of the first web page and the second web page.

8. The method of claim 1, further comprising:
calculating an engagement value associated with the first set of messages, wherein calculating the relevance score is further based on the engagement value.

9. The method of claim 8, wherein the engagement value is one selected from a group consisting of an average number of message rebroadcasts, an average number of favorites, an average number of likes, and an average number of replies.

10. The method of claim 1, further comprising:
extracting document text from the document;
analyzing the document text to determine that at least one relevant term of the message text is not found in the document text; and
associating the document text with the document in the storage repository, wherein calculating the relevance score is further based on the document text, and wherein the relevant term is weighed more heavily in calculating the relevance score than terms of the message text which also reside in the document text.

11. A system for searching documents, comprising:
a computer processor;
an aggregation module executing on the computer processor and configured to:
identify a first set of messages of a messaging platform referencing a document comprising a Web page;
identify message text of the first set of messages; and
associate the message text with the document in a storage repository; and
a search module configured to:
receive a search request comprising a search term provided by a client;
calculate a relevance score for the document based at least on the search term and the message text;
provide, to the client and based on the relevance score, a reference to the document in response to the search request;
identify a second set of messages posted to the messaging platform and referencing another document comprising a second web page;
analyze message text of the second set of messages;
determine, based on a predefined relevance signal, that the first web page is relevant to the second web page; and
calculate a second relevance score for the second web page based at least on the search term and the message text of the second set of messages, wherein calculating the relevance score is further based on the second relevance score.

12. The system of claim 11, wherein the aggregation module is further configured to:
calculate, based on the message text and the search term, a message relevance score for each message of the first set of messages; and
calculate a representative message relevance score based on the message relevance scores, wherein calculating the relevance score for the document is further based on the representative message relevance score.

13. The system of claim 12, wherein the aggregation module is further configured to:
identify, for each message of the first set of messages, an engagement value representing user engagement with the message, wherein the message relevance score of the message is further based on the engagement value.

14. The system of claim 11, wherein the aggregation module is further configured to:
identify a set of conversations associated with the first set of messages;
identify a set of reply messages in the set of conversations; and
analyze message text of the set of reply messages, wherein calculating the relevance score is further based on the message text of the set of reply messages.

15. The system of claim 14, wherein the aggregation module is further configured to:
identify a maximum threshold degree of separation value (N); and
determine that each of the set of reply messages is within N degrees of separation of at least one message of the first set of messages.

16. The system of claim 14, wherein the aggregation module is further configured to:
determine that a first subset of the set of reply messages are each within one degree of separation of at least one message of the first set of messages; and
determine that a second subset of the set of reply messages are each within two degrees of separation of at least one message of the first set of messages, wherein message text of the first subset is weighted more heavily than message text of the second subset when calculating the relevance score.

17. A non-transitory computer-readable storage medium comprising a plurality of instructions for searching documents, the plurality of instructions executing on at least one computer processor and comprising functionality to:
identify a first set of messages of a messaging platform referencing a document comprising a Web page;
identify message text of the first set of messages;
associate the message text with the document in a storage repository;
receive a search request comprising a search term provided by a client;
calculate a relevance score for the document based at least on the search term and the message text;
provide, to a client and based on the relevance score, a reference to the document in response to the search request;

identify a second set of messages posted to the messaging platform and referencing another document comprising a second web page;
analyze message text of the second set of messages;
determine, based on a predefined relevance signal, that the first web page is relevant to the second web page; and
calculate a second relevance score for the second web page based at least on the search term and the message text of the second set of messages, wherein calculating the relevance score is further based on the second relevance score.

18. The non-transitory computer-readable storage medium of claim 17, the plurality of instructions further comprising functionality to:
identify, for each message of the first set of messages, an engagement value representing user engagement with the message, wherein the relevance score is further based on the engagement value.

* * * * *